US011973617B2

(12) United States Patent
Beck et al.

(10) Patent No.: US 11,973,617 B2
(45) Date of Patent: *Apr. 30, 2024

(54) BORDER GATEWAY PROTOCOL (BGP) HIJACKS PREFIX SIGNING USING PUBLIC/PRIVATE KEYS

(71) Applicant: Charter Communications Operating, LLC, St. Louis, MO (US)

(72) Inventors: Jody Lee Beck, Parker, CO (US); Willard Andrew Gray, Castle Rock, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/512,972

(22) Filed: Oct. 28, 2021

(65) Prior Publication Data
US 2022/0052879 A1 Feb. 17, 2022

Related U.S. Application Data

(63) Continuation of application No. 16/554,798, filed on Aug. 29, 2019, now Pat. No. 11,212,139.

(51) Int. Cl.
*H04L 12/66* (2006.01)
*H04L 9/08* (2006.01)
*H04L 9/32* (2006.01)
*H04L 61/4511* (2022.01)

(52) U.S. Cl.
CPC ............ *H04L 12/66* (2013.01); *H04L 9/0825* (2013.01); *H04L 9/3247* (2013.01); *H04L 61/4511* (2022.05)

(58) Field of Classification Search
None
See application file for complete search history.

(56) References Cited

U.S. PATENT DOCUMENTS

| 7,996,475 | B2 | 8/2011 | Drako et al. |
| 8,923,515 | B2 | 12/2014 | McCann |
| 9,338,080 | B2 | 5/2016 | Patel et al. |
| 9,686,073 | B2 | 6/2017 | Goldstein |

(Continued)

FOREIGN PATENT DOCUMENTS

| WO | 2005/036838 A1 | 4/2005 |
| WO | WO-2018235085 A1 * | 12/2018 |

*Primary Examiner* — William J. Goodchild
(74) *Attorney, Agent, or Firm* — THE MARBURY LAW GROUP, PLLC

(57) ABSTRACT

Systems, methods, and devices of the various embodiments may enable distributed prefix signing by including a signature in a transitive Border Gateway Protocol (BGP) attribute of a new prefix announcement, and sending the new prefix announcement to peer components. The peer components may query an address and routing parameter area (ARPA) record to obtain nameserver information for an entity associated with the received prefix announcement in response to determining that the received prefix announcement includes a transitive BGP attribute that includes the signature, retrieve a public key from a Domain Name System (DNS) text record, and determine whether the signature included in the transitive BGP attribute of the received prefix announcement is valid based on the public key retrieved from the DNS text record.

25 Claims, 9 Drawing Sheets

(56) References Cited

U.S. PATENT DOCUMENTS

| | | | |
|---|---|---|---|
| 2004/0091117 A1* | 5/2004 | Narayanan | H04L 9/0827 380/277 |
| 2005/0025118 A1* | 2/2005 | Hao | H04L 45/04 370/254 |
| 2005/0074003 A1* | 4/2005 | Ball | H04L 45/04 370/389 |
| 2013/0041972 A1* | 2/2013 | Field | H04L 67/563 709/213 |
| 2014/0281505 A1* | 9/2014 | Zhang | H04L 63/126 713/158 |

* cited by examiner

BORDER GATEWAY PROTOCOL (BGP) HIJACKS PREFIX SIGNING USING PUBLIC/PRIVATE KEYS

RELATED APPLICATIONS

This application is a continuation of U.S. patent application Ser. No. 16/554,798 titled "Border Gateway Protocol (BGP) Hijacks Prefix Signing Using Public/Private Keys" filed Aug. 29, 2019, now issued as U.S. Pat. No. 11,212,139 the entire contents of which is hereby incorporated by reference for all purposes.

BACKGROUND

An autonomous system (AS) is a network or group of networks under common administration and with common routing policies. An example of an autonomous system is a network administered and maintained by a service provider network. Customer networks, such as universities or corporations, connect to the service provider network. The service provider network may route network traffic originating from the customer networks to an ultimate network destination. To facilitate this routing of network traffic, the autonomous systems must exchange routing information.

Border gateway protocol (BGP) is an exterior gateway protocol (EGP) that is used to exchange routing information among network components (e.g., routers) in the same or different autonomous systems. However, BGP lacks inherent security mechanism for verifying the authenticity and authority of BGP control traffic. As a result, service provider networks continually face the threat of intentional and unintentional security breaches and cyberattacks. One common form of attack is a BGP hijack in which a nefarious or malicious actor may manipulate BGP routing data to cause Internet traffic to be misrouted. The misrouting of Internet traffic due to BGP hijacks represents a significant security threat to service provider networks and Internet users as sensitive network traffic may be forwarded through malicious computing devices and/or not forwarded to its intended destination. As such, new and improved BGP security solutions would be beneficial to autonomous networks, service provider network, and the network components and user equipment devices that provide or use their services.

SUMMARY

The various aspects include methods for accomplishing distributed prefix signing Border Gateway Protocol (BGP) security, which may include including, by a processor in a computing device, a signature in a transitive BGP attribute of a new prefix announcement, and sending, by the processor in the computing device, the new prefix announcement that includes the transitive BGP attribute that includes the signature to a peer component. Some aspects may include publishing a public key in a Domain Name System (DNS) text record and using a private origination key to generate the signature for the new prefix announcement. In some aspects publishing the public key in the DNS text record may include publishing multiple public keys in multiple DNS text records to allow for key rotation and permit intendent third party prefix origination. Some aspects may include revoking the public key by updating the DNS text record The various aspects may also include distributed prefix signing Border Gateway Protocol (BGP) security methods that include receiving, by a processor in a network computing device, a prefix announcement that includes the transitive BGP attribute that includes the signature from the sender computing device and ignoring, by the processor, the prefix announcement in response to determining that the signature included in the transitive BGP attribute of the received prefix announcement is not valid.

Further aspects disclosed herein include a computing device having a processor configured with processor-executable instructions to perform operations of the methods summarized above. Further aspects disclosed herein include a computing device including means for performing functions of the methods summarized above. Further aspects disclosed herein include a non-transitory processor-readable storage medium having stored thereon processor-executable instructions configured to cause a computing device processor to perform operations of the methods summarized above. Further aspects disclosed herein include a system that includes a sender computing device (e.g., a route origination entity component) and a receiver computing device configured to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
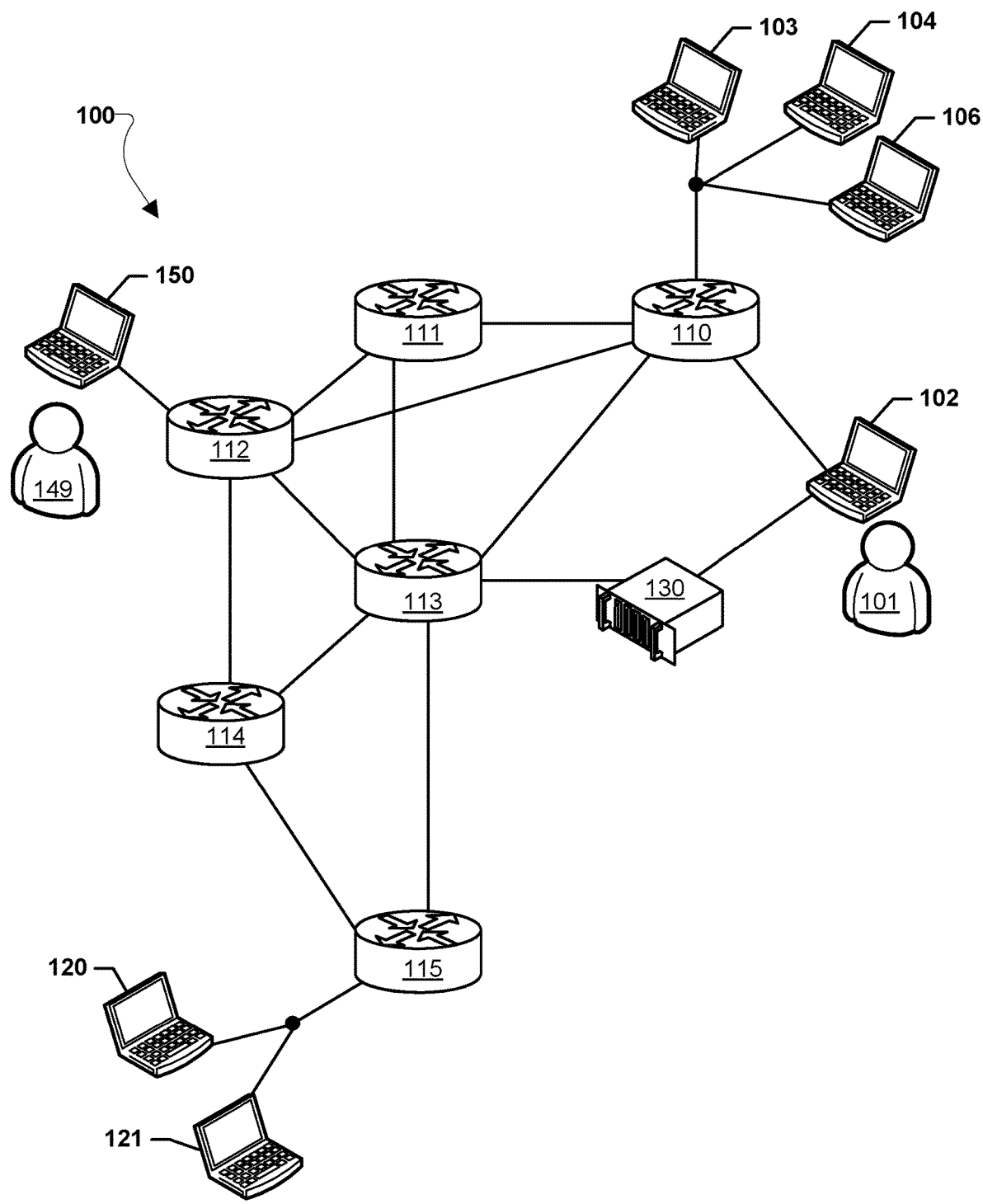
FIG. 1 is a communication system block diagram of an IP network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include components (e.g., a route origination entity component, receiver component, etc.) configured to perform distributed prefix signing border gateway protocol (BGP) security methods. An origination entity component/device may be configured to sign prefixes with a private key, include the signature in a transitive BGP attribute field, and publish the corresponding public key in a Domain Name Service (DNS) text record. A receiver component/device may be configured to receive a BGP prefix from the originating party, query the WHOIS for their Regional Internet Registry (RIR) to retrieve the DNS for the organization that owns the block/prefixes, use that DNS record and/or an internet protocol (IP) address "address and routing parameter area" (ARPA) record to obtain nameserver and retrieve public key, and use the public to validate the prefixes.

By performing the distributed prefix signing BGP security method, components configured in accordance with the embodiments may decentralize some of the tasks performed to achieve prefix validation. Such distribution is in closer alignment with the decentralized design of BGP, providing many of the same benefits of a centralized authority/security without the associated drawbacks discuss further below. In addition, by performing the distributed prefix signing BGP security method, components configured in accordance with the embodiments may also improve the security, performance and functioning of autonomous networks, service provider network, and the network components and user equipment devices that provide or use their services. Additional improvements and benefits associated with the implementation and use of the various embodiments will be evident from the disclosures below.

The term "service provider network" is used generically herein to refer to any network suitable for providing users with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The terms "component," "system," "engine," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The terms "computing device" and "user equipment (UE)" may be used interchangeably herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable users to access communications service providers' services and distribute them around their house via a local area network (LAN), and similar electronic devices which include a programmable processor and memory and circuitry for providing the functionality described herein.

The term "server" may be used herein to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server).

The term "WHOIS" is used herein to refer to a widely used query and response protocol for querying databases that store the registered users or assignees of an Internet resource, such as a domain name, an IP address block or an autonomous system, and other information. WHOIS services are typically communicated using the Transmission Control Protocol (TCP). Servers listen to requests on the well-known port number 43. Clients are simple applications that establish a communications channel to the server, transmit a text record with the name of the resource to be queried and await the response in form of a sequence of text records found in the database. This simplicity of the protocol also permits an application, and a command line interface user, to query a WHOIS server using other protocols (e.g., the Telnet protocol, etc.).

The Domain Name System (DNS) is a hierarchical and decentralized naming system for computers, services, or other resources connected to the Internet or a private network. DNS associates various information with domain names assigned to each of the participating entities, and translates domain names to the numerical IP addresses for locating and identifying computer services and devices with the underlying network protocols.

Internet Protocol Security (IPsec) is a secure network protocol suite that authenticates and encrypts the packets of data sent over an Internet Protocol (IP) network. IPsec includes protocols for establishing mutual authentication between agents at the beginning of a session and negotiation of cryptographic keys to use during the session. IPsec can protect data flows between a pair of hosts (host-to-host), between a pair of security gateways (network-to-network), or between a security gateway and a host (network-to-host). IPsec supports network-level peer authentication, data-origin authentication, data integrity, data confidentiality (encryption), and replay protection.

The public key infrastructure (PKI) is a system for issuing, authenticating and distributing certificates. In particular, PKI is a set of roles, policies, and procedures for creating, managing, distributing, using, storing and/or revoking digital certificates and managing public-key encryption. PKI binds public keys with respective identities of entities. The binding is established through a process of registration and issuance of certificates at and by a certificate authority (CA). A registration authority (RA) is responsible for accepting requests for digital certificates and authenticating the entity making the request.

The term "prefix" is used in this application to refer to a representation for a block of IP addresses. Prefixes may be expressed as "prefix/# most significant bits." For example, the prefix 192.68.0.0/16 has 16 significant bits, and thus represents all of the IP addresses between 192.68.0.0 and 192.68.255.255 inclusive. Generally, each autonomous system originates one or more prefixes representing the addresses assigned to hosts and devices within its network, and advertises the prefixes to its peers or neighbors.

Network Layer Reachability Information (NLRI) is a set of known prefixes and paths for all destinations in the Internet. Autonomous systems update their routing tables based on their neighbors' NLRI, and forward received NLRIs to each of their other neighbors in a process known as "flooding." This flooding process ensures that all autonomous systems are informed of the reachability of all prefixes.

Attestations are digitally signed statements used to assert the authenticity of prefix ownership and advertised routes. Address attestations claim the right to originate a prefix, and are signed and distributed out-of-band. The right to originate a prefix is checked through the validation of a delegation chain from the Internet Corporation for Assigned Names and Numbers (ICANN) to the advertising autonomous system.

A route origin authorization (ROA) is an attestation of a BGP route announcement. That is, a ROA attests that the origin autonomous system number is authorized to announce the prefix(es). Route attestations are signed by each autonomous system as it traverses the network, and all signatures on the path may sign previously attached signatures (e.g., the signatures are nested). The attestation may be verified cryptographically using the resource public key infrastructure (RPKI).

Resource public key infrastructure (RPKI) is a cryptographic method of signing records that associate a route announcement with the correct originating autonomous system number. RPKI is defined in Internet Engineering Task Force (IETF) Request for Comments: 6480 (An Infrastructure to Support Secure Internet Routing). In RPKI, the certificate structure mirrors the way in which Internet number resources are distributed. That is, resources are initially distributed by the Internet Assigned Numbers Authority (IANA) to the Regional Internet Registries (RIRs), which in turn distributes them to national or local Internet registries, which in turn distribute the resources to their customers.

Border gateway protocol (BGP) is an exterior gateway protocol (EGP) that is used to exchange routing information among network components (e.g., routers) in the same or different autonomous systems. A computer host that executes a BGP process may be referred to as a BGP host or a BGP device. To exchange routing information, two BGP hosts, or peers, first establish a transport protocol (e.g., TCP, etc.) connection with one another. The peers open a BGP session and exchange all their routing information. After the initial exchange of the routing information, the peers only exchange (or advertise) updates or changes to the routing information via UPDATE messages. That is, for as long as the BGP session is active, peers communicate UPDATE messages to inform each other of routing table changes, which may include the addition of new routes and withdrawal of old ones. These UPDATE messages may include the NLRI used to inform autonomous systems of the reachability of prefixes.

BGP is an important and critical aspect of a well-functioning communication network. However, BGP lacks inherent security mechanism for verifying the authenticity and authority of BGP control traffic. As such, BGP is highly vulnerable to a variety of intentional and unintentional security breaches and cyberattacks.

There are various BGP security techniques and technologies, such as secure BGP (S-BGP), resource public key infrastructure (RPKI) and AS_Path security tracking, that attempt to address some of these security vulnerabilities inherent in BGP. While these conventional security techniques/technologies provide some benefits or security improvements, many of them ultimately rely on a centralized authority to provide security or prefix validation. Since BGP was originally designed to work in a decentralized way, this reliance on a centralized authority may negate some of the benefits and efficiencies provided by BGP. These conventional security solutions may also introduce security vulnerabilities, latency, and/or computation complexities into the system.

Secure BGP (S-BGP) is a technology that uses IPsec, PKI, and a BGP path attribute containing "attestations" to address some of these security vulnerabilities inherent in BGP. S-BGP supports a pair of PKIs used to delegate address space and autonomous system numbers, as well as to associate particular network elements with their parent autonomous systems. A first PKI is used to authenticate address allocations through a hierarchy (e.g., from organizations to providers and the regional registries allocating them space, etc.). The second PKI is used to bind autonomous system numbers to organizations, and organizations to routers in their network, which may be accomplished through issued certificates. For example, an organization's autonomous system number may be bound to a public key through a certificate. Statements made by the autonomous system may be signed using the associated private key. The certificate may be used by an entity receiving the signed data to verify that it came from the autonomous system.

While the conventional S-BGP and RPKI method discussed above provide a number of benefits, they ultimately rely on a centralized authority to provide security and prefix validation, which may negate some of the benefits and efficiencies provided by BGP. These conventional security solutions may also introduce security vulnerabilities, latency, and/or computation complexities into the system. For these and other reasons, conventional S-BGP and RPKI security solutions do not adequately or efficiently secure BGP systems or the networks/systems that utilize them.

The various embodiments include components (e.g., an originator component, receiver component, etc.) configured to perform distributed prefix signing BGP security methods. An originator component may be configured to sign prefixes with a private key and publish the public key in a Domain Name Service (DNS) text record. A receiver component may be configured to use an IP address "address and routing parameter area" (ARPA) record to obtain nameserver and retrieve public key to validate the prefixes.

Various examples of different protocols are discussed herein, such as BGP, IPv4, and IPv6. The discussions of specific protocols, such as BGP, IPv4, and IPv6, are provided merely as examples to better illustrate the aspects of the various embodiments, and are not intended to limit the various embodiments in any way. Other protocols may be used with the various embodiments, and the other protocols may be substituted in the various examples without departing from the spirit or scope of the invention.

FIG. 1 illustrates an IP network 100 suitable for use with various embodiments. The IP network 100 may include multiple devices, such as routers 110, 111, 112, 113, 114, 115, monitoring devices 130, and computing devices 102, 103, 104, 106, 120, 121, 150. While each router 110, 111, 112, 113, 114, 115 is illustrated in FIG. 1 as a single device, each router 110, 111, 112, 113, 114, 115 may be one or more routers of an entity or AS. The routers 110, 111, 112, 113, 114, 115 and computing devices 102, 103, 104, 106, 120, 121, 150 or the network 100 may exchange data with one another according to IP protocols via their various connections with one another. Collectively, the connections between the routers 110, 111, 112, 113, 114, 115 may represent the Internet and the data routed between the routers 110, 111, 112, 113, 114, 115 may be Internet traffic. The routers 110, 111, 112, 113, 114, 115 may exchange routing information with one another according to BGP. Each router 110, 111, 112, 113, 114, 115 may have its own respective ASN assigned to it to distinguish one router from another router.

A router 110 of an entity, such as a service provider network, may be connected to various computing devices receiving service from that entity, such as computing devices 103, 104, 106. A router 115 of a different entity, such as a different service provider network, may be connected to various computing devices receiving service from that entity, such as computing devices 120, 121. A range of IP addresses, i.e., a netblock, may be assigned to each different entity (e.g., on a per ASN basis), and the respective computing devices of that entity may be assigned IP addresses within that netblock. Each netblock may have a different IP address prefix. For example, computing devices 103, 104, 106 connected to the router 110 of a first entity may have IP addresses within that first entity's netblock identified by a first IP address prefix and computing devices 120, 121 connected to router 115 of a second entity may have IP addresses with the second entity's netblock identified by a second IP address prefix. As the first IP address prefix of the first netblock may identify that the netblock is associated with the router 110, Internet traffic destined for IP addresses in the first netblock may be routed to router 110 by the other routers 111, 112, 113, 114, 115. Similarly, as the second IP address prefix of the second netblock may identify that the netblock is associated with the router 115, Internet traffic destined for IP addresses in the second netblock may be routed to router 115 by the other routers 110, 111, 112, 113, 114.

The various routers 110, 111, 112, 113, 114, 115 may exchange BGP messages with one another to create, update, and withdraw routing paths among one another in their respective routing tables. As BGP events occur, BGP messages, such as BGP messages reflecting BGP updates, BGP withdraws, etc., may be generated and sent from the routers 110, 111, 112, 113, 114, 115. A monitoring device 130 may be a computing device configured to monitor the BGP messages. The monitoring device 130 may analyze the BGP messages to determine whether or not a BGP hijack, such as a BGP netblock hijack, is occurring. The monitoring device 130 may be connected to a computing device 102 of an entity, such as the service provider network, operating router 110 and providing service to computing devices 103, 104, 106. Computing device 102 may be operated by a technician 101 and may output indications of BGP hijacks to the technician 101. Additionally, computing device 102 may control BGP routing information for the entity operating router 110. While illustrated as separate devices 102, 130 in FIG. 1, the monitoring device 130 may alternatively be part of computing device 102, such as a virtual machine running on a processor of computing device 102.

During normal operation, routing of Internet traffic among the routers 110, 111, 112, 113, 114, 115 may occur according to the BGP routing information advertised by the respective entities operating those routers 110, 111, 112, 113, 114, 115. For example, the entity operating router 110 may be assigned the netblock "24.158.32.0/22" and may cause traffic to be routed to router 110 by sending a BGP update announcing a route with the route prefix "24.158.32.0/22". The route prefix "24.158.32.0/22" indicates the IP address prefix of the netblock of the entity "24.158.32.0/22" and that the entity's IP address prefixes are 22 bits long. Routers 111, 112, 113, 114, and 115 may then update their routing tables to route Internet traffic for the netblock "24.158.32.0/22" to router 110 according to the BGP update and Internet traffic destined for computing device 103, 104, 106 with IP addresses in the netblock "24.158.32.0/22" may flow to router 110 for routing to those computing devices.

In a BGP netblock hijack, a malicious attacker 149 may use his or her computing device 150 to corrupt an AS, such as router 112, to hijack netblocks that are not assigned to the malicious attacker 149. The computing device 150 of the malicious attacker 149 may cause Internet traffic to be misrouted by controlling the router 112 to announce a malicious route with a more-specific prefix of a netblock the malicious attacker 149 is not actually assigned.

As a further example, a router 110 may be associated with netblock "24.158.32.0/22", and normally announce its routes with a routing prefix of "24.158.32.0/22". To hijack Internet traffic intended for the netblock "24.158.32.0/22", the computing device 150 of the malicious attacker 149 may announce a malicious route with the routing prefix "24.158.32.0/23" that is more-specific that the entity's normal routing prefix of "24.158.32.0/22". The announcement of the malicious route may be propagated between routers 111, 112, 113, 114, 115 according to BGP and the malicious route with the more-specific routing prefix (i.e., routing prefix "24.158.32.0/23") may be used to route Internet traffic by all impacted routers 111, 112, 113, 114, and 115. In this manner, the malicious attacker 149 may hijack the netblock "24.158.32.0/23" because the malicious route will be used for routing Internet traffic, rather than the intended route by the entity actually assigned the netblock "24.158.32.0/22".

For example, Internet traffic addressed to computing device 103 sent by computing device 120 may be routed from router 115 to router 114 and onto router 112 because the routing prefix "24.158.32.0/23" now associated with router 112 and computing device 150 is more-specific than the entity's normal routing prefix of "24.158.32.0/22".

Figure 2:
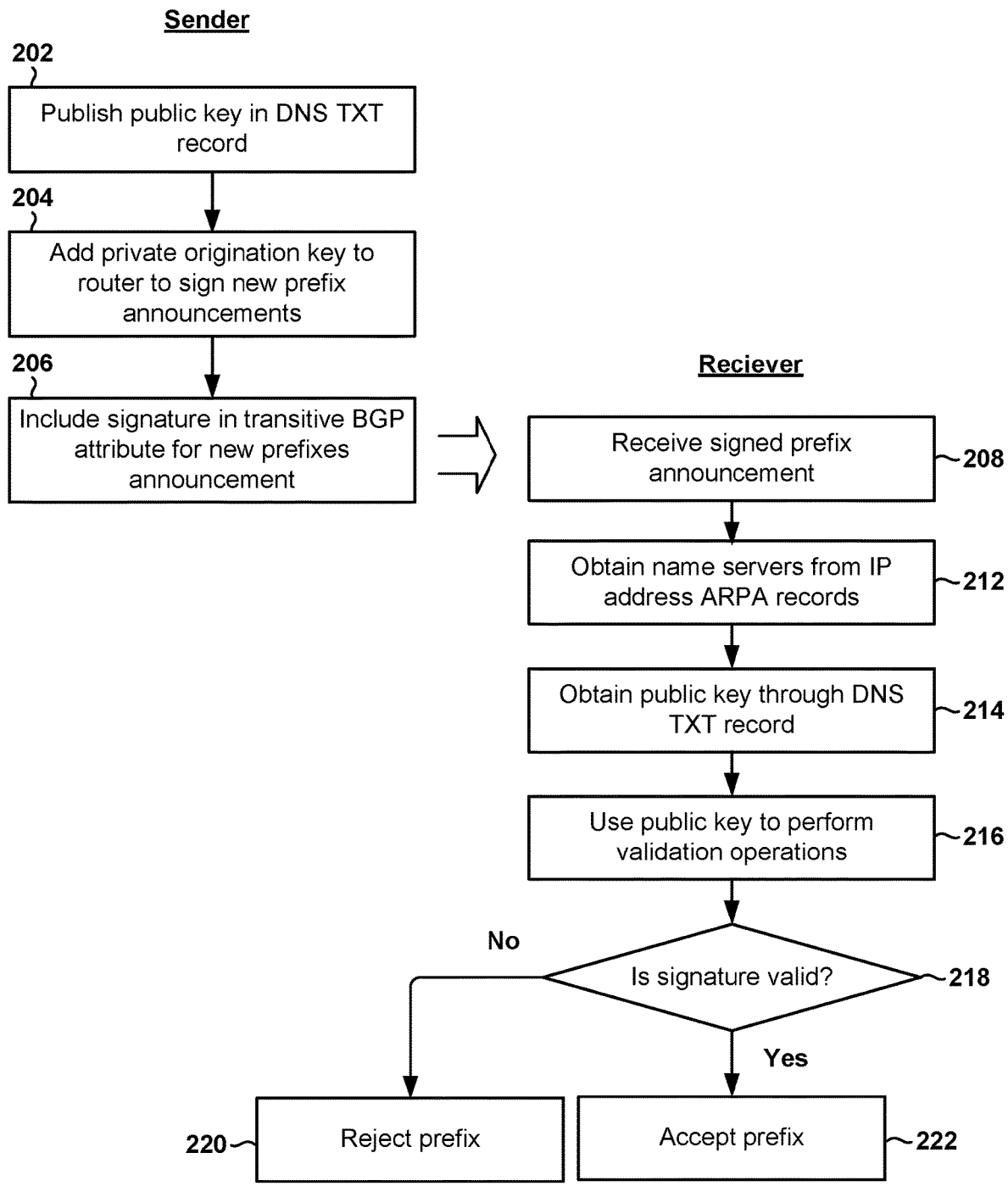
FIG. 2 is a process flow diagram illustrating an embodiment method for accomplishing distributed prefix signing Border Gateway Protocol (BGP) security.

FIG. 2 is a process flow diagram illustrating a distributed prefix signing BGP security method 200 in accordance with an embodiment. In various embodiments, the operations of method 200 may be performed by one or more processors in one or more computing devices.

In block 202, a processor in a sender component (e.g., a network server in an autonomous system, etc.) may publish a public key in DNS TXT record.

In block 204, the sender component may add a private origination key to a router in the autonomous system to cause the router (or other network components) to sign new prefix announcements with the private origination key.

In block 206, the sender component (or router, other network component, etc.) may include the signature in a transitive BGP attribute for a new prefix announcement, and send out the prefix announcement to all its peers or neighbors. In some embodiments, the components may be configured to include the signatures in prefix announcements performed as part of the flooding process that ensures that all autonomous systems are informed of the reachability of all prefixes, which are representations for blocks of IP addresses assigned to hosts and devices within the network.

In block 208, a receiver component (e.g., a network server in an autonomous system, etc.) may receive a prefix announcement from the sender. In some embodiments, the receiver component may determine that prefix announcement includes a transitive BGP attribute that includes a signature, and validate the signed prefix announcement.

In block 212, the receiver component may obtain name servers from IP address ARPA records for the prefix announcement. In block 214, the receiver component may obtain the public key for the obtained name servers and/or the prefix announcement through the DNS TXT record. In some embodiments, this may be accomplished by querying a WHOIS database that stores information regarding the registered users or assignees of Internet resources, including domain names, IP address blocks, etc. In block 216, the receiver component may use the public key obtained through the DNS TXT to perform validation operations.

In determination block 218, the receiver component may use the results of the validation operations to determine whether the signature in the transitive BGP attribute of the received prefix announcement is a valid signature signed by an authorized entity. In response to determining that the signature in the transitive BGP attribute of the received prefix announcement is not a valid signature (i.e., determination block 218="No"), the receiver component may reject the prefix announcement in block 220. In response to determining that the signature in the transitive BGP attribute of the received prefix announcement is a valid signature (i.e., determination block 218="Yes"), the receiver component may accept the prefix announcement in block 222.

Figure 3A:
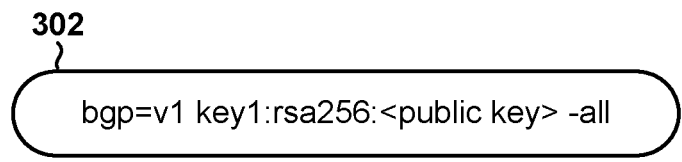
FIG. 3A-3D illustrate information elements suitable for use in accomplishing distributed prefix signing BGP security in accordance with some embodiments.

FIG. 3A illustrates an example public key TXT record 302 that could be used to perform a distributed prefix signing BGP security method 200 in some embodiments. In the example illustrated in FIG. 3A, the bgp=v1 indicates version 1 of the standard, "key1" indicates that it is the first listed public key, "rsa256" indicates the crypto standard used for the public key, "<public key>" represents a uniquely generated public key from public/private key pair, and "-all" indicates that anything not signed should be failed or rejected. That is, drawing from SPF "~all" indicates to the components to soft fail unsigned prefixes rather than hard fail them. This could be lowering the preference of those prefixes or providing data to more complex heuristic systems for scoring.

Figure 3B:
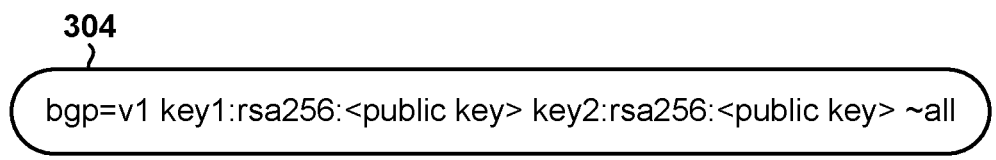

FIG. 3B illustrates another example public key TXT record 304 that could be used to perform a distributed prefix signing BGP security method 200 in some embodiments. In the example illustrated in FIG. 3B, the public key TXT record 304 includes "key2" and a "~all." In some embodiments, the second key (i.e., key2) may be used to rotate previous key, reduce risk of one key is compromised, or allow a 3rd party other entity to announce space owned by organization without needing to share primary private key with them.

In some embodiments, a key (e.g., key1, key2, etc.) may be revoked by removing the public key from the DNS record and allowing the expiration to propagate through DNS.

The "~all" in the public key TXT record 304 may indicate to the components to soft fail unsigned prefixes rather than hard fail them. This could lower the preference of those prefixes or provide data to more complex heuristic systems for scoring.

Figure 3C:
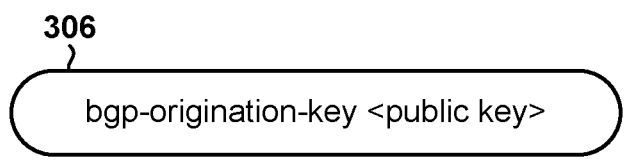

FIG. 3C illustrates an example private key 306 that could be added to a router or routers originating routes into the BGP in some embodiments (e.g., as part of block 204 of the distributed prefix signing BGP security method 200 illustrated in FIG. 2). The element "<private key>" in FIG. 3C represents a uniquely generated private key from public/private key pair.

Figure 3D:
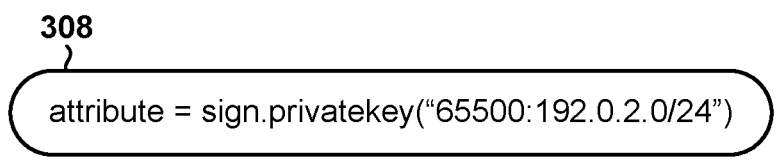

FIG. 3D illustrates a transitive BGP attribute 308 in which the private key (e.g., private key 306 illustrated in FIG. 3C) may be included in some embodiments (e.g., as part of block 206 of the distributed prefix signing BGP security method 200 illustrated in FIG. 2). In particular, FIG. 3D illustrates that, when a network component creates a new BGP route and announces the BGP route, it may sign the ASN:Prefix combination with the private key.

Figure 4:
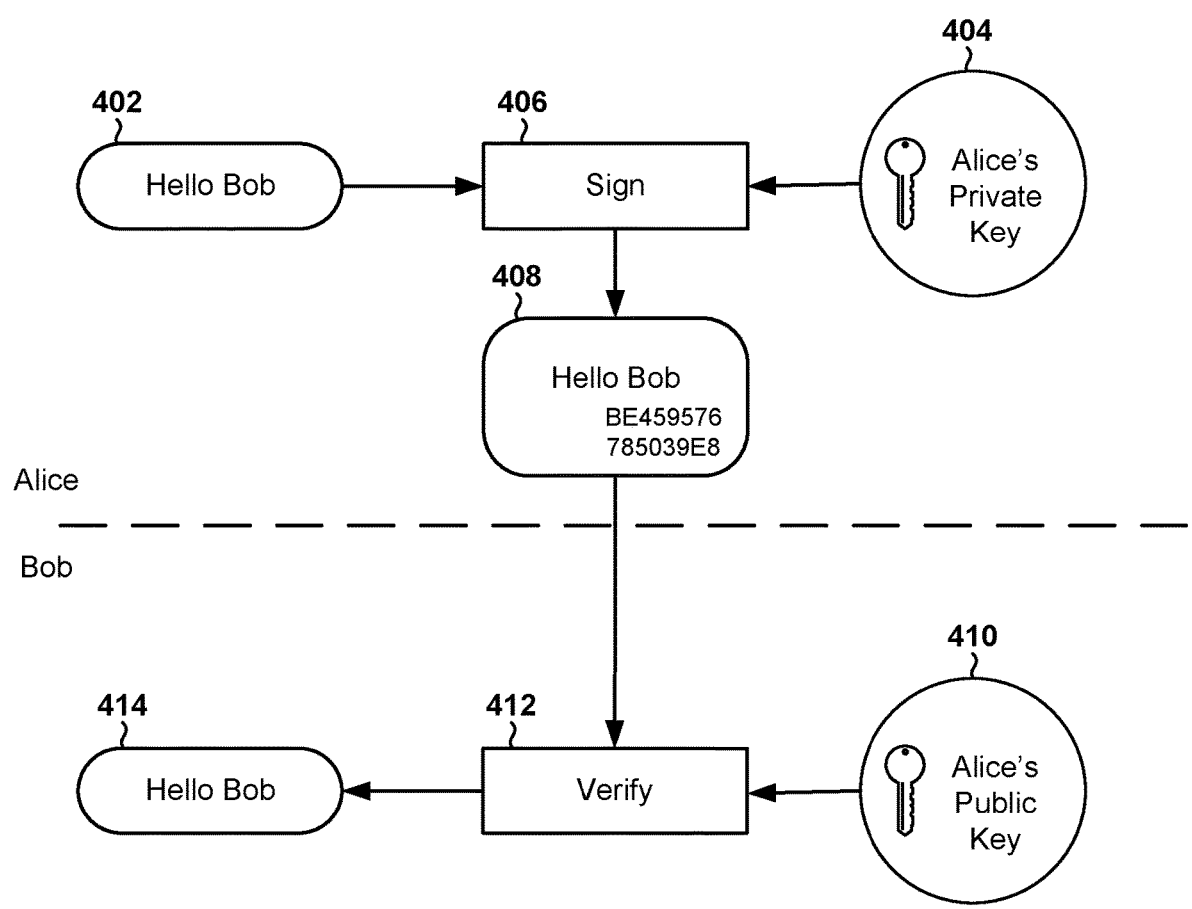
FIG. 4 is a block diagram illustrating the use of public and private keys to sign records in accordance with some embodiments.

FIG. 4 illustrates operations in a system configured to perform distributed prefix signing BGP security method in accordance with some embodiments. In particular, that Alice (or component A) may generate a "hello bob" message in block 402, use Alice's private key 404 sign the "hello bob" message in block 406 to generate a signed message 408. Bob (or component B) may receive the signed message 408, use Alice's public key 410 to verify the signed message 408 in block 412, and accept only the verified signed messages 414.

Figure 5:
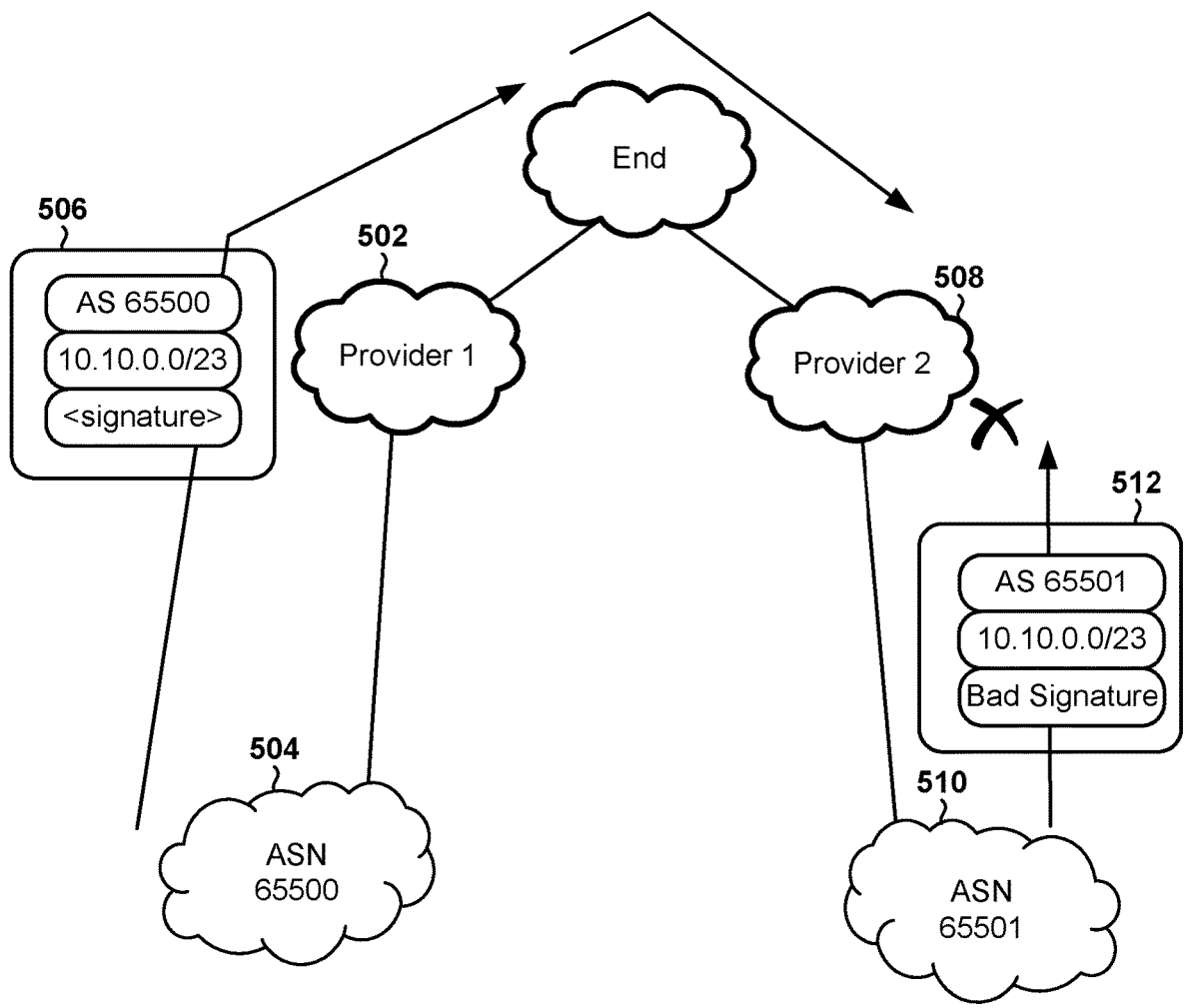
FIGS. 5-7 are block diagrams that illustrates components and operations in a system configured to accomplish distributed prefix signing BGP security in accordance with some embodiments.
Figure 6:
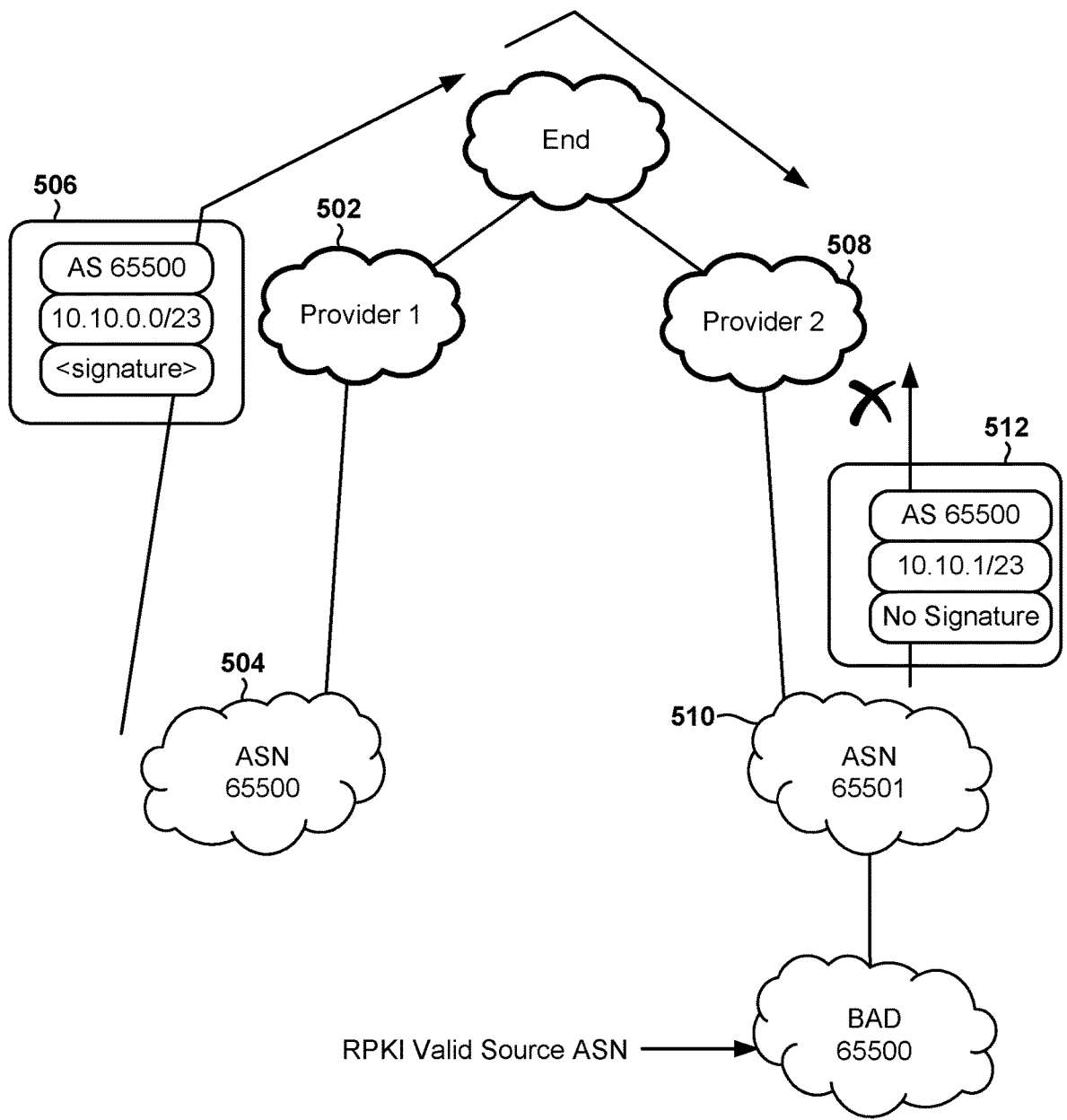
Figure 7:
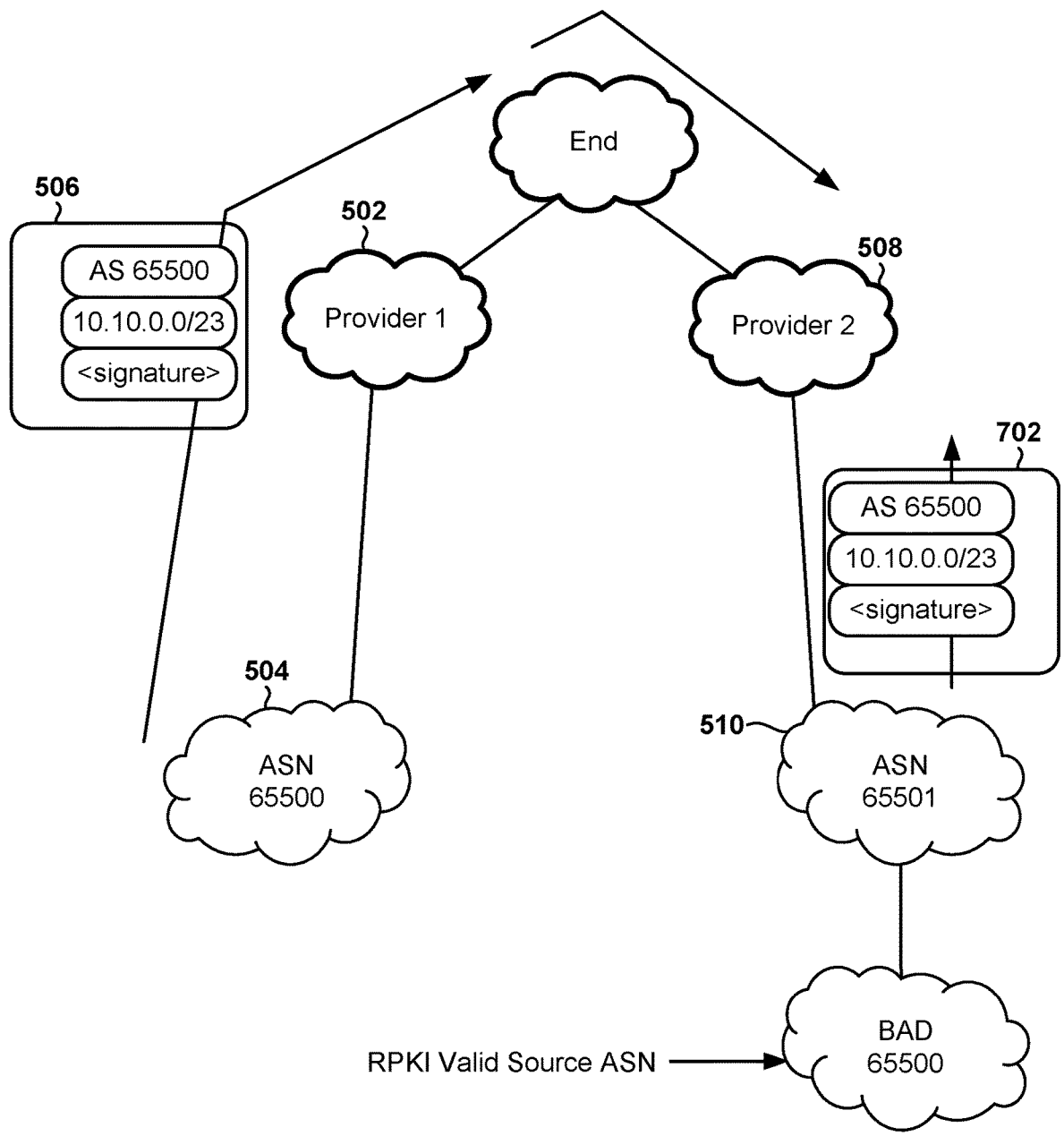

FIGS. 5-7 illustrate various components and operations in a system configured to perform distributed prefix signing BGP security method in accordance with some embodiments.

In the examples illustrated in FIGS. 5 and 6, a first service provider network (provider 1) 502 accepts a prefix from a first autonomous system 504 having an autonomous system number (ASN) of 65500 because the prefix announcement 506 includes a signature in a transitive BGP attribute. A second service provider network (provider 2) 502 rejects a prefix from a second autonomous system 510 having an ASN of 65501 because the prefix announcement 512 includes a bad signature or the prefix is from the wrong ASN. In the example illustrated in FIG. 7, both prefixes 506, 702 are accepted because they include signatures that match the public key for block owner.

Figure 8:
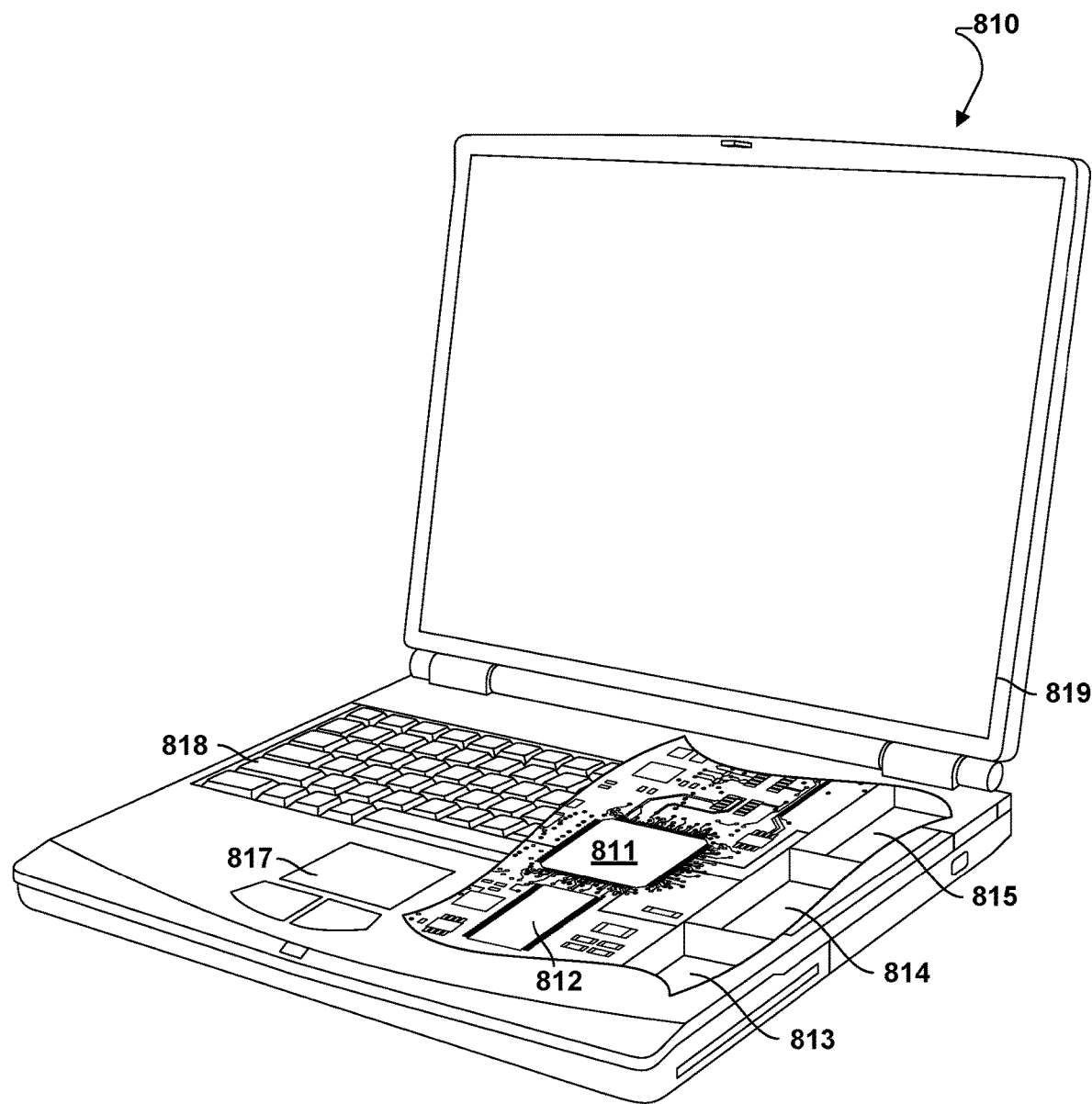
FIG. 8 is a component diagram of an example computing device suitable for use with some embodiments.

FIG. 8 is a component diagram of an example computing device suitable for use with various embodiments. The various embodiments (including, but not limited to, embodiments discussed above with reference to FIGS. 1-7)

described above may also be implemented within a variety of computing devices, such as a laptop computer 810 as illustrated in FIG. 8. Many laptop computers include a touch pad touch surface 817 that serves as the computer's pointing device, and thus may receive drag, scroll, and flick gestures similar to those implemented on mobile computing devices equipped with a touch screen display and described above. A laptop computer 810 will typically include a processor 811 coupled to volatile memory 812 and a large capacity nonvolatile memory, such as a disk drive 813 of Flash memory. The laptop computer 810 may also include a floppy disc drive 814 and a compact disc (CD) drive 815 coupled to the processor 811. The laptop computer 810 may also include a number of connector ports coupled to the processor 811 for establishing data connections or receiving external memory devices, such as a USB or FireWire® connector sockets, or other network connection circuits (e.g., interfaces) for coupling the processor 811 to a network. In a notebook configuration, the computer housing may include the touchpad 817, the keyboard 818, and the display 819 all coupled to the processor 811. Other configurations of the computing device may include a computer mouse or trackball coupled to the processor (e.g., via a USB input) as are well known, which may also be used in conjunction with the various embodiments.

Figure 9:
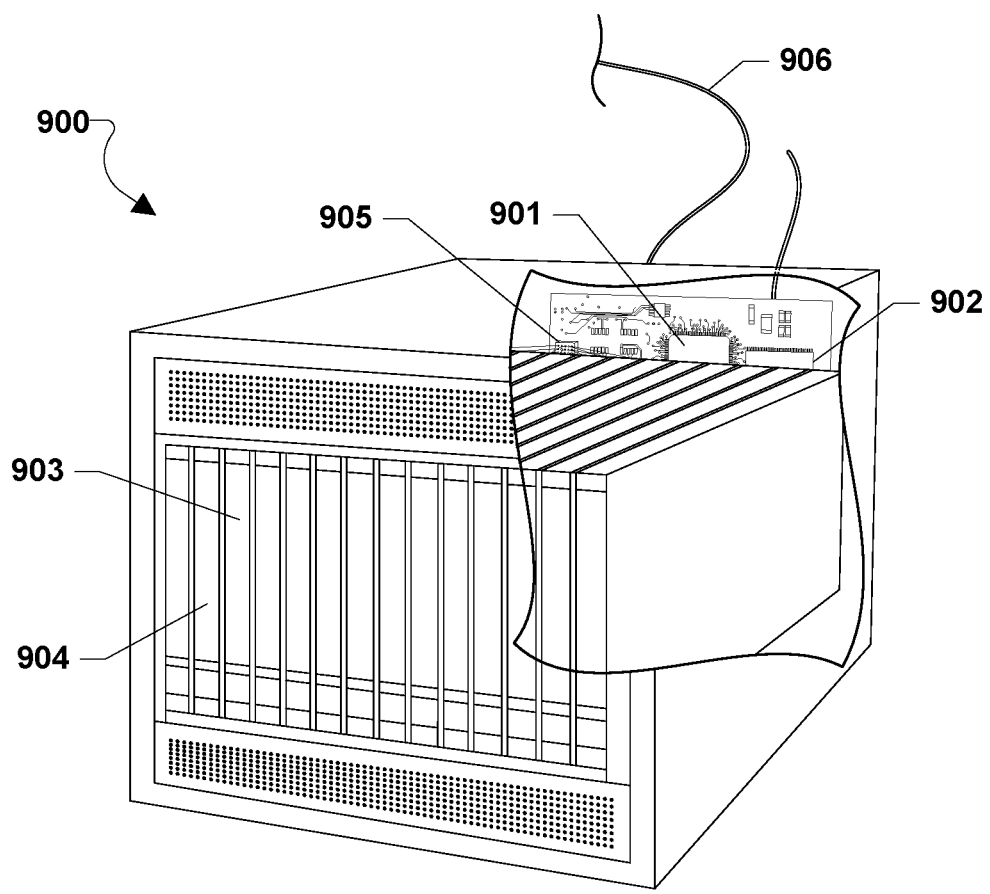
FIG. 9 is a component diagram of an example server suitable for use with some embodiments.

Various embodiments (including, but not limited to, embodiments discussed above with reference to FIGS. 1-7) may be implemented on any of a variety of commercially available server devices, such as the server device 900 illustrated in FIG. 9. Such a server device 900 may include a processor 901 coupled to volatile memory 902 and a large capacity nonvolatile memory, such as a disk drive 903. The server device 900 may also include a floppy disc drive, compact disc (CD) or DVD disc drive 904 coupled to the processor 901. The server device 900 may also include network access ports 906 coupled to the processor 901 for establishing data connections with a network connection circuit 905 and a communication network (e.g., IP network) coupled to other communication system network elements.

The processors 511, 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 511, 901. The processors 511, 901 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 511, 901 including internal memory or removable memory plugged into the device and memory within the processors 511, 901 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for accomplishing distributed prefix signing Border Gateway Protocol (BGP) security, comprising:
    generating a signature for a new prefix announcement by a processor in a first peer component of a network;
    including, by the processor, the signature in a transitive BGP attribute of the new prefix announcement; and
    sending, by the processor, the new prefix announcement that includes the transitive BGP attribute that includes the signature to a second peer component of the network.

2. The method of claim 1, further comprising:
    publishing a public key in a Domain Name System (DNS) text record; and
    using a private origination key to generate the signature.

3. The method of claim 2, wherein publishing the public key in the DNS text record comprises publishing multiple public keys in multiple DNS text records.

4. The method of claim 2, further comprising revoking the public key by updating the DNS text record.

5. A computing device operating as a first peer in a network, comprising:
    a processor in the first peer component of the network, the processor configured with processor-executable software instructions to:
        generate a signature for a new prefix announcement;
        include the signature in a transitive Border Gateway Protocol (BGP) attribute of the new prefix announcement; and
        send the new prefix announcement that includes the transitive BGP attribute that includes the signature to a second peer component of the network.

6. The computing device of claim 5, wherein the processor is further configured to:
    publish a public key in a Domain Name System (DNS) text record; and
    use a private origination key to generate the signature.

7. The computing device of claim 6, wherein the processor is configured to publish the public key in the DNS text record by publishing multiple public keys in multiple DNS text records.

8. The computing device of claim 6, wherein the processor is configured with processor-executable software instructions to revoke the public key by updating the DNS text record.

9. A non-transitory computer readable storage medium having stored thereon processor-executable software instructions configured to cause a processor in a computing device operating as a first peer in a network to perform operations comprising:
    generating, by the first peer component of the network, a signature for a new prefix announcement;
    including the signature in a transitive Border Gateway Protocol (BGP) attribute of the new prefix announcement; and
    sending the new prefix announcement that includes the transitive BGP attribute that includes the signature to a second peer component of the network.

10. The non-transitory computer readable storage medium of claim 9, wherein the stored processor-executable software instructions are configured to cause the processor in the computing device to perform operations further comprising:
    publishing a public key in a Domain Name System (DNS) text record; and
    using a private origination key to generate the signature.

11. The non-transitory computer readable storage medium of claim 10, wherein the stored processor-executable software instructions are configured to cause the processor in the computing device to perform operations such that publishing the public key in the DNS text record comprises publishing multiple public keys in multiple DNS text records.

12. The non-transitory computer readable storage medium of claim 10, wherein the stored processor-executable software instructions are configured to cause the processor in the computing device to perform operations further comprising revoking the public key by updating the DNS text record.

13. A computing device operating as a first peer in a network, comprising:
    means for generating, by the first peer component of the network, a signature for a new prefix announcement;
    means for including the signature in a transitive Border Gateway Protocol (BGP) attribute of the new prefix announcement; and
    means for sending the new prefix announcement that includes the transitive BGP attribute that includes the signature to a second peer component of the network.

14. The computing device of claim 13, further comprising:
    means for publishing a public key in a Domain Name System (DNS) text record; and
    means for using a private origination key to generate the signature.

15. The computing device of claim 14, wherein the means for publishing the public key in the DNS text record comprises means for publishing multiple public keys in multiple DNS text records.

16. The computing device of claim 14, further comprising means for revoking the public key by updating the DNS text record.

17. A distributed prefix signing Border Gateway Protocol (BGP) security method, comprising:
    receiving, by a processor in a second peer component of a network, a prefix announcement from a first peer component of the network that includes a transitive BGP attribute that includes a signature for the prefix announcement that was generated by the first peer component of the network; and
    ignoring, by the processor, the prefix announcement in response to determining that the signature included in the transitive BGP attribute of the received prefix announcement is not valid.

18. A computing device, comprising:
    a processor of a second peer component of a network, the processor configured with processor-executable software instructions to:
        receive, from a first peer component of the network, a prefix announcement that includes a transitive BGP attribute that includes a signature for the prefix announcement that was generated by the first peer component of the network; and ignore the prefix announcement in response to determining that the signature included in the transitive BGP attribute of the received prefix announcement is not valid.

19. A non-transitory computer readable storage medium having stored thereon processor-executable software instructions configured to cause a processor in a computing device to perform operations comprising:

receiving, by a second peer component in a network from a first peer component in the network, a prefix announcement that includes a transitive BGP attribute that includes a signature for the prefix announcement that was generated by the first peer component in the network; and ignoring the prefix announcement in response to determining that the signature included in the transitive BGP attribute of the received prefix announcement is not valid.

20. A computing device, comprising:

means for receiving, by a second peer component in a network from a first peer component in the network, a prefix announcement that includes a transitive BGP attribute that includes a signature for the prefix announcement that was generated by the first peer component of the network; and means for ignoring the prefix announcement in response to determining that the signature included in the transitive BGP attribute of the received prefix announcement is not valid.

21. A system, comprising:

a sender computing device comprising a sender processor, wherein the sender computing device is a first peer component of a network; and a receiver computing device comprising a receiver processor, wherein the receiver computing device is a second peer component of the network, wherein the sender processor is configured with processor-executable software instructions to:

generate a signature for a new prefix announcement;

include the signature in a transitive Border Gateway Protocol (BGP) attribute of the new prefix announcement; and send the new prefix announcement that includes the transitive BGP attribute that includes the signature to the receiver computing device, and wherein the receiver processor is configured with processor-executable software instructions to:

receive the new prefix announcement that includes the transitive BGP attribute that includes the signature from the sender computing device; and ignore the new prefix announcement in response to determining that the signature included in the transitive BGP attribute of the received prefix announcement is not valid.

22. The system of claim 21, wherein the sender processor is further configured to:

publish a public key in a Domain Name System (DNS) text record; and use a private origination key to generate the signature.

23. The system of claim 22, wherein the sender processor is configured to publish the public key in the DNS text record by publishing multiple public keys in multiple DNS text records.

24. The system of claim 22, wherein the sender processor is configured with processor-executable software instructions to revoke the public key by updating the DNS text record.

25. The system of claim 21, wherein the sender computing device is a route origination entity in an autonomous network.

* * * * *